Patented Feb. 18, 1947

2,416,237

UNITED STATES PATENT OFFICE 2,416,237

5-NITRO-2-FURALDEHYDE 5'(β-HYDROXYETHYL) SEMIOXAMAZONE

William B. Stillman and Albert B. Scott, Norwich, N. Y., assignors, by mesne assignments, to Eaton Laboratories, Inc., Norwich, N. Y., a corporation of New York No Drawing. Original application August 28, 1945, Serial No. 613,205. Divided and this application October 25, 1946, Serial No. 705,794

1 Claim. (Cl. 260—345)

This invention relates to a new chemical compound 5-nitro-2-furaldehyde 5'(β-hydroxyethyl) semioxamazone, described by the formula:

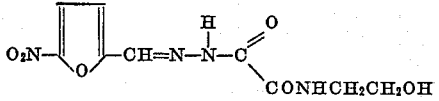

We have made the discovery that this new compound, while sharing the antiseptic properties which are common to many nitrofurans, is distinguished from most other nitrofurans by its effectiveness against infections when administered orally. In doses well below the toxic limit, it has proved highly effective in the treatment of streptococcus and trypanosome infections, and is a valuable chemotherapeutic agent.

The new compound is made as follows:

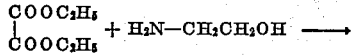

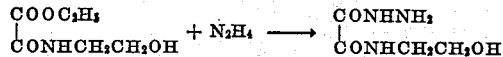

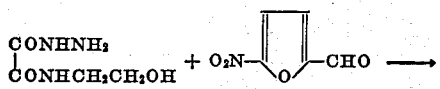

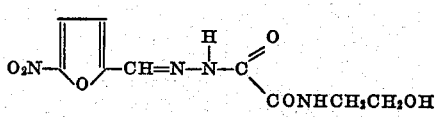

A solution of 36.5 g. (0.25 mole) of ethyl oxalate in 75 cc. of ethanol is cooled to 0°. To this is added in one portion, a solution of 15 g. (0.25 mole) of amino ethanol in 75 cc. of ethanol, and the mixture is allowed to stand in the ice-box overnight. It is then filtered from a small amount of white solid, the ethanol is removed by distillation, and the residue is taken up in water and extracted with ether to remove any unchanged ethyl oxalate. The aqueous layer is refluxed for one hour with 10 g. of hydrazine hydrate and is then cooled. There is obtained 23 g. (72%) of 5-hydroxyethyl semioxamazide; M. P. 170–173°. To an aqueous solution of 8.05 g. (0.05 mole) of this product is added 7.05 g. (0.05 mole) of nitrofurfural, and the mixture is thoroughly shaken. The light yellow solid thus obtained (yield, 10.6 g., 78.5%) is purified by washing with warm ethanol; microcrystalline solid; M. P. 242–244° d.; solubility in water, 1:35,000.

This application is a division of our application Serial No. 613,205, filed August 28, 1945, as a continuation-in-part of our applications filed May 17, 1944, and bearing Serial Nos. 536,046, 536,047 and 536,048.

What is claimed is:

5 - nitro - 2 - furaldehyde 5' (β-hydroxyethyl) semioxamazone represented by the formula:

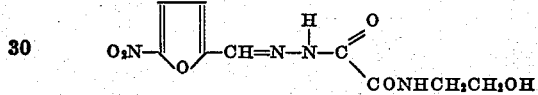

WILLIAM B. STILLMAN.
ALBERT B. SCOTT.